United States Patent
Kato et al.

(10) Patent No.: US 9,495,738 B2
(45) Date of Patent: Nov. 15, 2016

(54) SEMICONDUCTOR COMPONENT MOUNTING APPARATUS

(71) Applicant: YAMAHA HATSUDOKI KABUSHIKI KAISHA, Shizuoka (JP)

(72) Inventors: Hiroshi Kato, Shizuoka (JP); Koji Omi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 622 days.

(21) Appl. No.: 13/966,024

(22) Filed: Aug. 13, 2013

(65) Prior Publication Data

US 2014/0055598 A1 Feb. 27, 2014

(30) Foreign Application Priority Data

Aug. 27, 2012 (JP) ................................ 2012-186294

(51) Int. Cl.
*H04N 7/18* (2006.01)
*G06T 7/00* (2006.01)

(52) U.S. Cl.
CPC ... *G06T 7/0008* (2013.01); *G06T 2207/30148* (2013.01)

(58) Field of Classification Search
CPC .............. G06T 2207/30148; G06T 7/0008; G06T 7/0002; G06T 7/0004; G06T 2224/1134; H01L 2021/60067; H01L 2021/60225
USPC .......................................... 348/87, 125, 126
See application file for complete search history.

(56) References Cited

U.S. PATENT DOCUMENTS

| 6,201,892 B1* | 3/2001 | Ludlow ............. G01N 21/8806 250/559.34 |
| 6,584,420 B1* | 6/2003 | Minami ............... G06K 9/3275 382/147 |

(Continued)

FOREIGN PATENT DOCUMENTS

| JP | H06-222010 A | 8/1994 |
| JP | 07-142545 A | 6/1995 |

(Continued)

OTHER PUBLICATIONS

An Office Action issued by the Korean Patent Office on Dec. 18, 2014, which corresponds to Korean Patent Application No. 10-2013-0093182 and is related to U.S. Appl. No. 13/966,024.

(Continued)

*Primary Examiner* — Sath V Perungavoor
*Assistant Examiner* — Nathnael Aynalem
(74) *Attorney, Agent, or Firm* — Studebaker & Brackett PC

(57) ABSTRACT

A semiconductor component mounting apparatus includes an image sensing unit, electrode detection unit, and determination unit. The image sensing unit is configured to obtain image data of a plurality of electrodes arranged on a mounting surface of a semiconductor component. The electrodes are divided into a plurality of groups based upon functions of the electrodes. The electrode detection unit is configured to identify the electrodes in each of the groups, and to detect, for each of the electrodes, whether the electrode is lacking or not by using the image data. Each of the groups has a preset permissible number of lacking electrodes. The determination unit is configured to determine, based on the number of the lacking electrodes detected by the electrode detection unit and the permissible number of lacking electrodes preset to the group, whether the semiconductor component is a defective or a non-defective.

3 Claims, 4 Drawing Sheets

(56) References Cited

U.S. PATENT DOCUMENTS

| | | |
|---|---|---|
| 2003/0067072 A1 | 4/2003 | Ono et al. |
| 2005/0129304 A1* | 6/2005 | Sasazawa .......... G01B 11/0608 382/150 |
| 2006/0040442 A1* | 2/2006 | Fukae .................. G06T 7/0006 438/232 |
| 2010/0000084 A1 | 1/2010 | Park et al. |
| 2010/0090333 A1* | 4/2010 | Hayashi ............ H01L 23/49838 257/693 |
| 2010/0158346 A1* | 6/2010 | Fang ..................... G06T 7/001 382/149 |
| 2012/0020545 A1* | 1/2012 | Oike .................... G06T 7/0008 382/141 |

FOREIGN PATENT DOCUMENTS

| | | |
|---|---|---|
| JP | H10-209210 A | 8/1998 |
| JP | H11-251799 A | 9/1999 |
| JP | 2006-222106 A | 8/2006 |
| JP | 4327289 B2 | 6/2009 |
| JP | 4338374 B2 | 7/2009 |
| JP | 4338374 B2 | 10/2009 |
| KR | 2010-0005492 A | 1/2010 |
| TW | 200514962 A | 5/2005 |
| TW | I241397 B | 10/2005 |

OTHER PUBLICATIONS

An Office Action issued by the Taiwanese Patent Office on Jul. 17, 2014, which corresponds to Taiwanese Patent Application No. 102127662 and is related to U.S. Appl. No. 13/966,024.

An Office Action issued by the Japanese Patent Office on Jul. 22, 2014, which corresponds to Japanese Patent Application No. 2012-186294 and is related to U.S. Appl. No. 13/966,024.

* cited by examiner

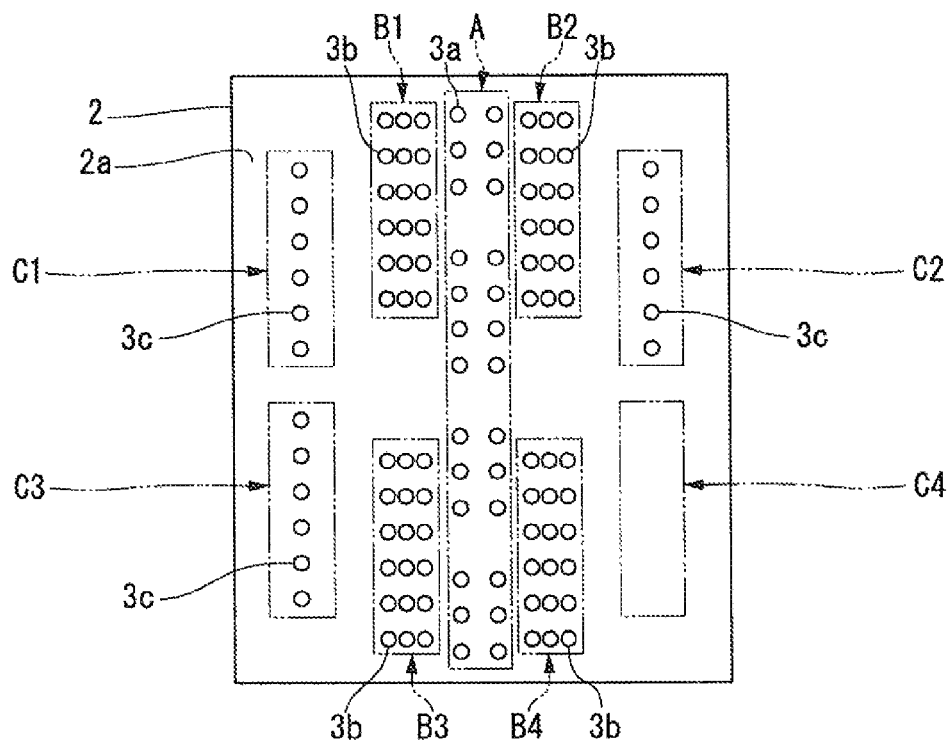
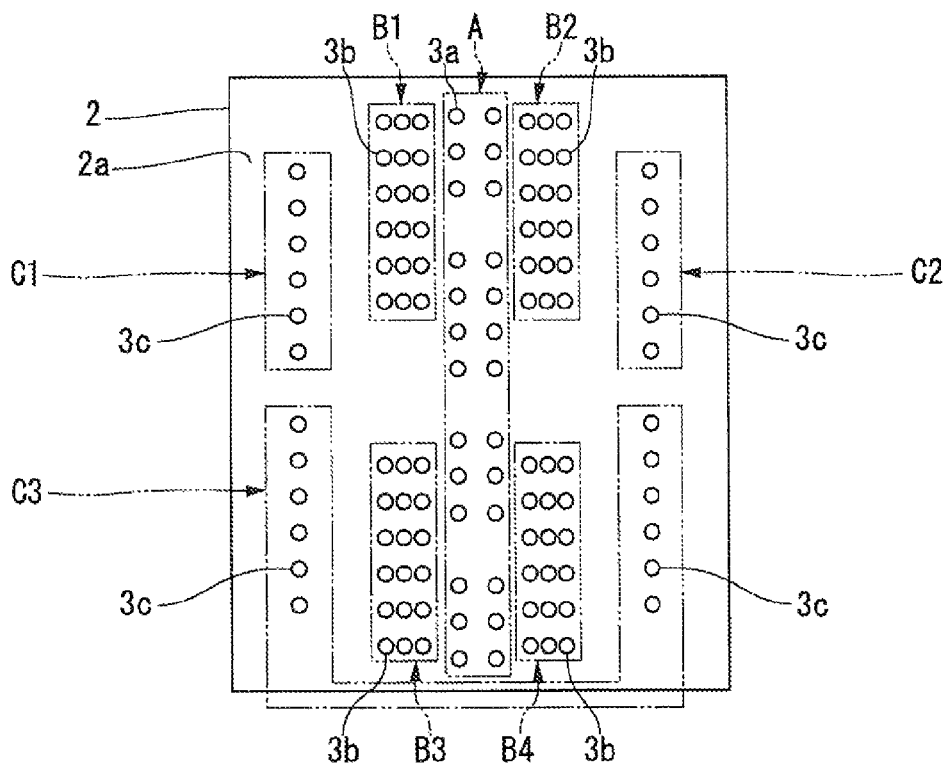

SEMICONDUCTOR COMPONENT MOUNTING APPARATUS

BACKGROUND OF THE INVENTION

The present invention relates to a semiconductor component mounting apparatus for mounting, on a substrate, a semiconductor component such as a die chip or flip chip cut out from a semiconductor wafer.

Conventionally, it is often the case that a semiconductor component such as a die chip or flip chip cut out from a semiconductor wafer is sucked by a suction nozzle and mounted on a substrate. When mounting the semiconductor component on the substrate, the positions of mounting electrodes need to be recognized at high accuracy.

Apparatuses for recognizing the positions of the electrodes of a semiconductor component are described in, e.g., Japanese Patent Laid-Open No. 7-142545 (to be also referred to as literature 1 hereinafter) and Japanese Patent No. 4327289 (to be also referred to as literature 2 hereinafter). A mounting apparatus disclosed in literature 1 includes a camera for sensing a flip chip IC, and a determination unit which determines the quality of the flip chip IC based on image data obtained by image sensing by the camera.

When the positional error amount or area value of the electrode exceeds a predetermined allowance, the determination unit determines that the flip chip IC is a defective.

A component recognition apparatus described in literature 2 senses the electrodes (bumps) of an electronic component by using a camera, and obtains the electrode positions based on the image data. The component recognition apparatus is configured to be able to exclude false electrodes (noise and dirt) and obtain electrode positions.

The respective electrodes of the above-mentioned semiconductor component have functions assigned to them. More specifically, some electrodes are connected to a communication circuit for communication, and others are dedicated to coupling reinforcement for improving the mounting state. In a semiconductor component including many coupling reinforcement electrodes, not all coupling reinforcement electrodes need be arranged.

However, the apparatuses described in literatures 1 and 2 determine that a semiconductor component lacked in even one electrode is a defective. In the apparatuses described in literatures 1 and 2, even a semiconductor component in which only one coupling reinforcement electrode is lacked is determined as a defective. For this reason, the apparatuses described in literatures 1 and 2 discard many semiconductor components, decreasing the productivity.

SUMMARY OF THE INVENTION

The present invention has been made to solve the above problems, and has as its object to provide a semiconductor component mounting apparatus which permits lack of an electrode depending on its function, and decreases the number of semiconductor components to be discarded, thereby increasing the productivity.

To achieve the above object, according to the present invention, there is provided a semiconductor component mounting apparatus comprising an image sensing unit configured to sense a plurality of electrodes arranged on a mounting surface of a semiconductor component; an electrode detection unit configured to identify the electrodes in each of a plurality of groups arranged based upon functions of the electrodes, and to detect, for each of the electrodes, whether the electrode is lacking or not by using image data obtained by the image sensing unit, each of the groups having a preset permissible number of lacking electrodes; and a determination unit configured to determine quality of the semiconductor component, based on the number of the lacking electrodes detected by the electrode detection unit, the determination unit determining that the semiconductor component is a defective in a case that there is a group in which the electrodes more than the permissible number of lacking electrodes preset to the group are lacking, and determining that the semiconductor component is a non-defective, in the other cases.

BRIEF DESCRIPTION OF THE DRAWINGS

FIG. 7 is a bottom view of the semiconductor component to explain the operation of the determination unit; and FIG. 8 is a bottom view of the semiconductor component to explain another example of groups.

DESCRIPTION OF THE PREFERRED EMBODIMENT

A preferred embodiment of a semiconductor component mounting apparatus according to the present invention will be described in detail with reference to FIGS. 1 to 8.

Figure 1:
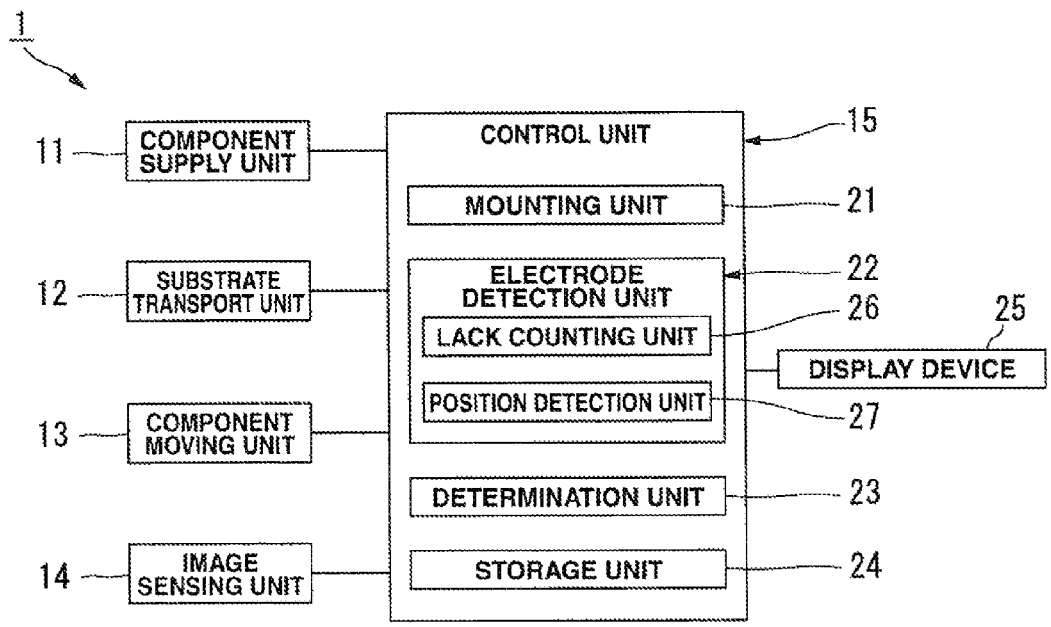
FIG. 1 is a block diagram showing the arrangement of a semiconductor component mounting apparatus according to the present invention.
Figure 2:
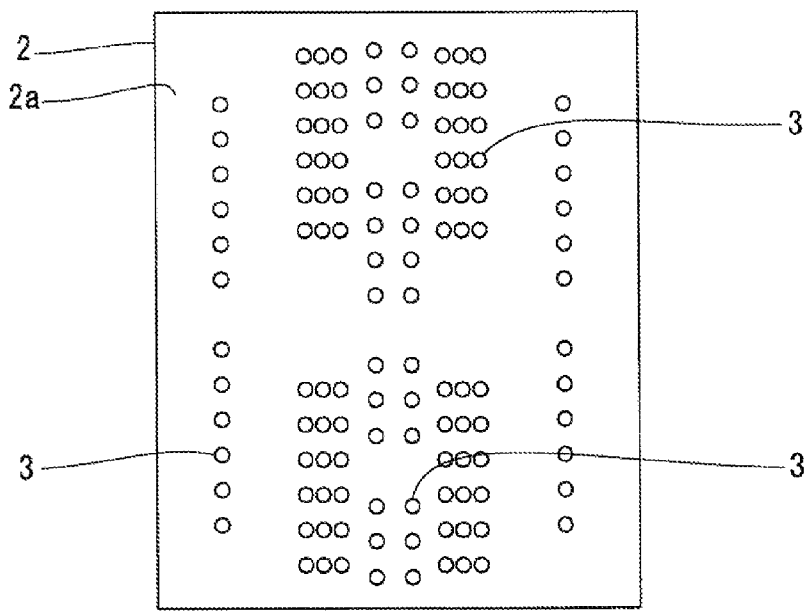
FIG. 2 is a bottom view showing the mounting surface of a semiconductor component.

A semiconductor component mounting apparatus 1 shown in FIG. 1 mounts a semiconductor component 2 (see FIG. 2) on a semiconductor device substrate (not shown). Examples of the semiconductor component 2 are a flip chip package, and a die chip cut out from a silicon wafer. Many bumps 3 are formed as mounting electrodes on a mounting surface 2a of the semiconductor component 2.

As shown in FIG. 1, the semiconductor component mounting apparatus 1 according to the embodiment includes a component supply unit 11, substrate transport unit 12, component moving unit 13, image sensing unit 14, and control unit 15.

The component supply unit 11 supplies the semiconductor component 2.

The substrate transport unit 12 loads and positions, to a predetermined mounting position, a substrate (not shown) for mounting the semiconductor component 2 thereon, and unloads it from the mounting position after mounting.

The component moving unit 13 includes a suction nozzle (not shown) which sucks and supports the semiconductor component 2. The component moving unit 13 moves the semiconductor component 2 from the component supply unit 11 to the substrate at the mounting position, and mounts it.

The image sensing unit 14 senses the bumps 3 of the semiconductor component 2 sucked by the suction nozzle.

The image sensing unit 14 sends image data obtained by image sensing to the control unit 15 to be described below.

The control unit 15 includes a mounting unit 21, electrode detection unit 22, determination unit 23, and storage unit 24, and is connected to a display device 25. The display device 25 displays the result of determination by the determination unit 23 to be described later.

The mounting unit 21 controls the operations of the component supply unit 11, substrate transport unit 12, component moving unit 13, and image sensing unit 14.

The electrode detection unit 22 includes a lack counting unit 26 and position detection unit 27 to be described below.

The lack counting unit 26 detects the presence/absence of lack for all the bumps 3 by comparing the predicted position of each bump and the actual bump 3. The predicted position of each bump is a bump position described in manufacturing data of the semiconductor component 2. The actual bump 3 is a bump detected using image data obtained by image sensing by the image sensing unit 14.

Figure 3:
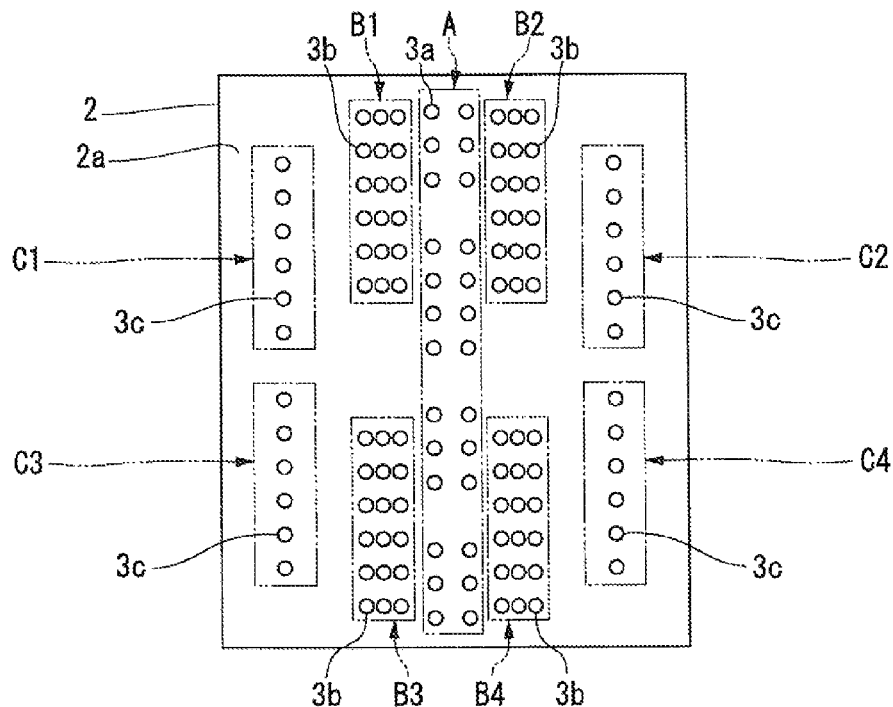
FIG. 3 is a bottom view of the semiconductor component to explain the layout of groups.

The semiconductor component mounting apparatus 1 according to the embodiment adopts an arrangement in which all the bumps 3 are divided into a plurality of groups for respective functions and then identified. As shown in FIG. 3, the plurality of groups are a first group A, a plurality of second groups B1 to B4, and a plurality of third groups C1 to C4. The storage unit 24 of the control unit 15 saves data representing the name of a group to which each bump 3 belongs, and data representing the manufacturing position of each bump 3.

The first group A is set at only one portion for one semiconductor component 2. The first group A includes only the bumps 3, lack of which is inhibited. The bumps 3, lack of which is inhibited, are, e.g., many communication bumps 3a, as shown in FIG. 3. The communication bump 3a according to the embodiment are arranged in line in the lengthwise direction at the center of the semiconductor component 2 in the widthwise direction (in FIG. 3, the left-and-right direction and a direction perpendicular to the longitudinal direction of the semiconductor component 2. There are two lines of the communication bumps 3a.

The second groups B1 to B4 are set at positions around the first group A. Each of the second groups B1 to B4 includes many bumps 3 having the same function. The bumps 3 included in the second groups B1 to B4 are, e.g., ground bumps 3b. The ground bumps 3b are arranged to form the respective bump groups (second groups B1 to B4) at four portions on the two sides of the communication bumps 3a in the widthwise direction and on two sides in the lengthwise direction. Each of the bump groups at these four portions is formed from 18 ground bumps 3b.

The third groups C1 to C4 are set at four portions on one semiconductor component 2. Each of the third groups C1 to C4 includes many bumps 3 having the same function. The bumps 3 included in the third groups C1 to C4 are, e.g., coupling reinforcement bumps 3c. The coupling reinforcement bumps 3c are arranged as the respective bump groups (third groups C1 to C4) at the two ends of the semiconductor component 2 in the widthwise direction and on two sides in the lengthwise direction. Each of the bump groups at these four portions is formed from six coupling reinforcement bumps 3c arranged in line in the lengthwise direction.

For the first to third groups, the numbers of bumps 3a to 3c, lack of which is permitted, are set in advance, respectively. The number of communication bumps 3a in the first group A, lack of which is permitted, is 0. That is, lack of the communication bumps 3a in the first group A is inhibited.

The number of ground bumps 3b in the second groups B1 to B4, lack of which is permitted, can be set to, e.g., 5. In this case, for example, lack of five of the 18 ground bumps 3b included in the second group B1 is permitted. The number of coupling reinforcement bumps 3c in the third groups C1 to C4, lack of which is permitted, can be set to, e.g., 6. In this case, lack of all the six bumps 3 in the third group C1 is permitted.

The lack counting unit 26 according to the embodiment sequentially detects the presence/absence of lack for all the bumps 3a to 3c, and integrates the number of lacks. More specifically, when lack of one of the bumps 3a to 3c is detected, the lack counting unit 26 increments the total number of lacked bumps 3a to 3C by one, and increments by one the number of lacks in the group including the lacked one of the bumps 3a to 3c.

The storage unit 24 saves the total number of lacks and the number of lacks in each group, which are counted by the lack counting unit 26.

The position detection unit 27 detects the relative position of the semiconductor component 2 with respect to the suction nozzle based on the position of each bump 3 detected by the electrode detection unit 22. The detection data is sent to the mounting unit 21 and used to correct the mounting position of the semiconductor component 2.

The determination unit 23 determines the quality of the semiconductor component 2 based on the number of lacked bumps 3 obtained by the electrode detection unit 22. If the first condition out of two conditions to be described below is not satisfied, the determination unit 23 according to the embodiment determines that the semiconductor component 2 is a defective; otherwise, a non-defective. Also, if the second condition to be described below is not satisfied, the determination unit 23 according to the embodiment determines that the semiconductor component 2 is a defective; otherwise, a non-defective.

The first condition is that the number of lacks in each group, which is integrated for each group, is equal to or smaller than the permissible number of lacked bumps 3 that is set for the group. That is, if there is a group in which the bumps 3 are lacked by more than the permissible number of lacked bumps 3, the determination unit 23 determines that the semiconductor component 2 is a defective.

The second condition is that the total number of lacked bumps 3 (the total number of bumps 3 lacked in all the groups) is equal to or smaller than a predetermined number of determined lacks. That is, even when the first condition is satisfied, if the total number of lacks is larger than the number of determined lacks, the determination unit 23 determines that the semiconductor component 2 is a defective; otherwise, a non-defective. The number of determined lacks can be set to, e.g., about ⅓ of the total number of bumps 3.

Figure 4:
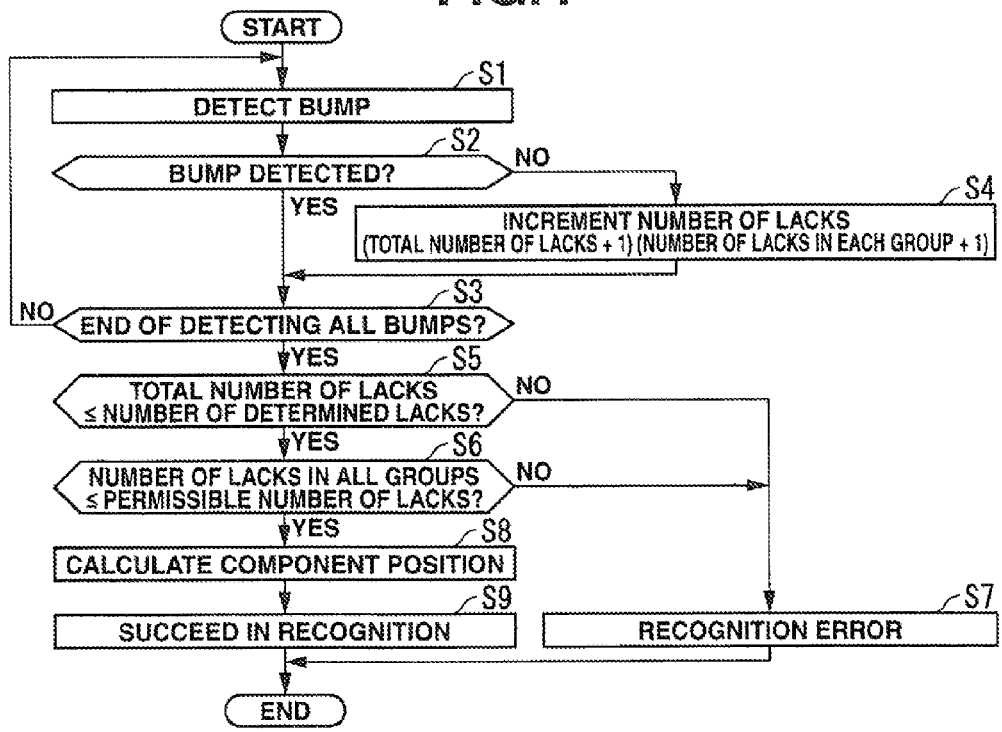
FIG. 4 is a flowchart for explaining the operation of the semiconductor component mounting apparatus according to the present invention.
Figure 5:
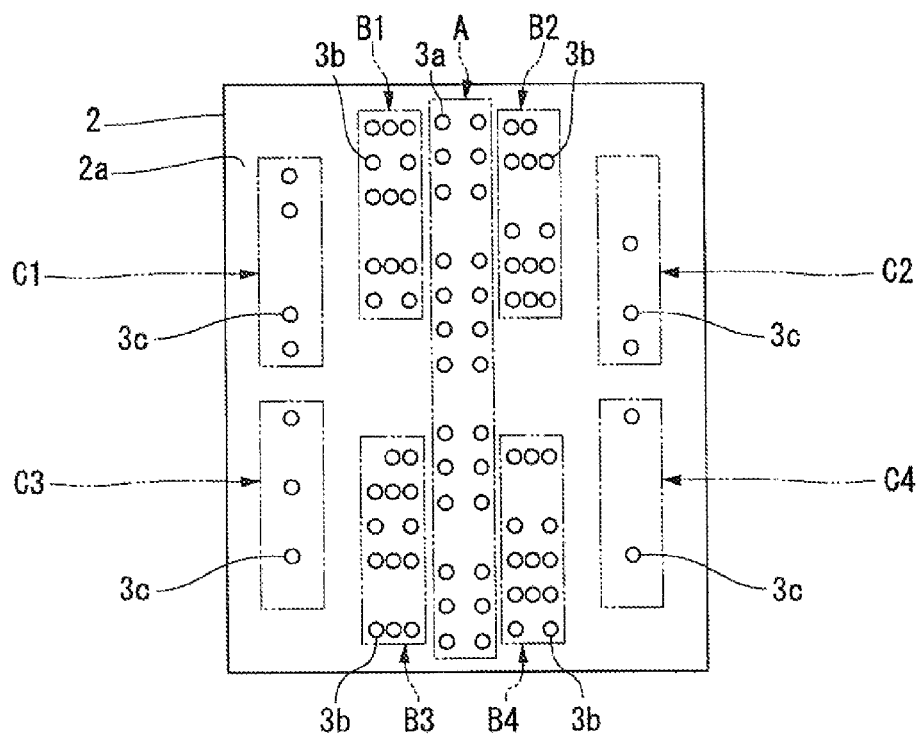
FIG. 5 is a bottom view of the semiconductor component to explain the operation of a determination unit.
Figure 6:
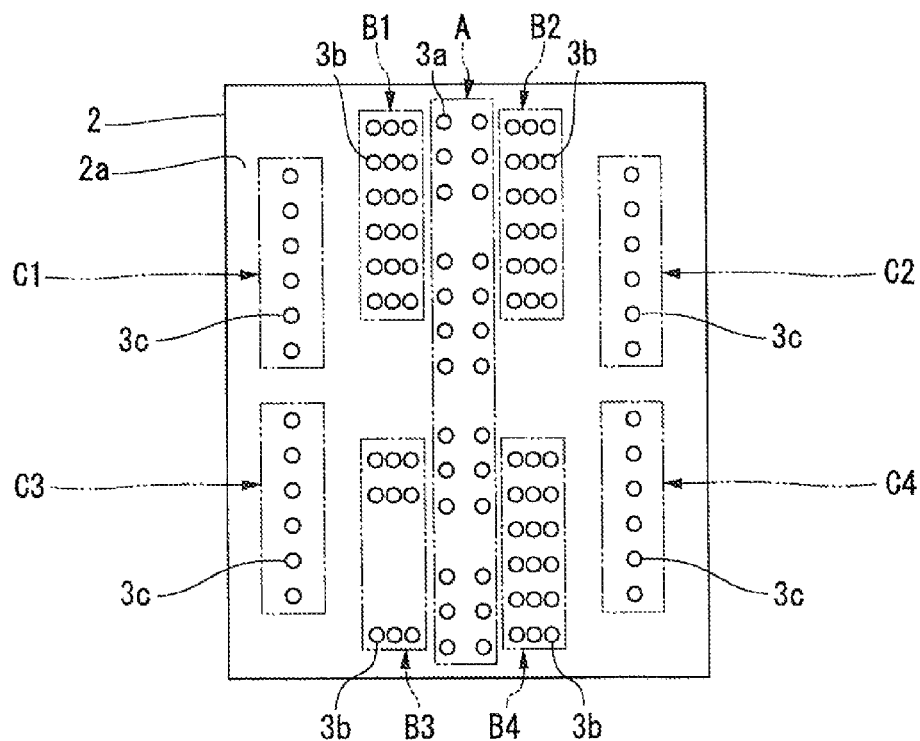
FIG. 6 is a bottom view of the semiconductor component to explain the operation of the determination unit.

The operation of the semiconductor component mounting apparatus 1 having the above-described arrangement will be explained in detail with reference to the flowchart of FIG. 4.

The semiconductor component mounting apparatus 1 according to the embodiment sucks the semiconductor component 2 by using the suction nozzle in the component supply unit 11, and then moves it to above the image sensing unit 14. The image sensing unit 14 senses the semiconductor component 2. After that, in step S1 of the flowchart shown in FIG. 4, the lack counting unit 26 of the control unit 15 predicts the position of the bump 3 based on manufacturing data of the semiconductor component 2. In step S2, the lack counting unit 26 determines whether the bump 3 exists at the predicted position.

If the bump 3 exists at the predicted position, the process advances to step S3, and the lack counting unit 26 determines whether the presence/absence of all the bumps 3 has been detected.

If the bump 3 does not exist at the predicted position, the lack counting unit 26 increments the total number of lacks by one and increments the number of lacks in each group by one in step S4.

After determining the presence/absence of lack for all the bumps 3, the determination unit 23 determines the quality in steps S5 and S6. That is, the determination unit 23 determines in step S5 whether the total number of lacks is equal to or smaller than the number of determined lacks. If the total number of lacks is larger than the number of determined lacks, the determination unit 23 determines that the semiconductor component 2 is a defective, and the display device 25 displays a recognition error in step S7. A semiconductor component 2 shown in FIG. 5 has a total of 32 lacks, and when the number of determined lacks is set to 30, the semiconductor component 2 becomes a defective.

If the total number of lacks is equal to or smaller than the number of determined lacks in step S5, the determination unit 23 determines in step S6 whether the first condition has been satisfied. That is, the determination unit 23 determines the presence/absence of a group in which the number of lacks in each group exceeds the permissible number of lacks. If there is a group in which the number of lacks exceeds the permissible number of lacks, the process advances to step S7. In a semiconductor component 2 shown in FIG. 6, nine bumps 3 in the second group B3 are lacked. When the permissible number of lacks for the second group B3 is 5, the semiconductor component 2 becomes a defective. In a semiconductor component 2 shown in FIG. 7, six (all) bumps 3 in the third group C4 are lacked. However, when the permissible number of lacks for the third group C4 is 6, the semiconductor component 2 becomes a non-defective.

If the number of lacks in each group is equal to or smaller than the permissible number of lacks in all the groups, the process advances to step S8. In step S8, the position detection unit 27 calculates the position of the semiconductor component 2 based on the positions of the bumps 3. After that, in step S9, the display device 25 displays the success of recognition.

If the number of bumps 3 lacked in each group is equal to or smaller than the permissible number of lacks, the semiconductor component mounting apparatus 1 having this arrangement determines that the semiconductor component 2 is a non-defective. According to the embodiment, even the semiconductor component 2 lacked in the bumps 3 can be mounted without discarding it. The embodiment can therefore provide the semiconductor component mounting apparatus which increases the productivity.

If the total number of bumps 3 lacked in all the groups (the total number of lacks) is larger than a predetermined number of determined lacks, the determination unit 23 according to the embodiment determines that the semiconductor component 2 is a defective; otherwise, a non-defective.

If the total number of lacked bumps 3 is large, a trouble is highly likely to occur, compared to a case in which the total number of lacked bumps 3 is small. Although the semiconductor component mounting apparatus 1 according to the embodiment permits lack of the bumps 3 to a certain degree, it can flexibly determine that the semiconductor component 2 which may cause a trouble is a defective.

Hence, the embodiment can provide the semiconductor component mounting apparatus capable of mounting the semiconductor component 2 not only to increase the mounting productivity, but also to improve the reliability of an electronic device.

The groups according to the embodiment are the first group A including only the communication bumps 3a, lack of which is inhibited, the second groups B1 to B4 including only the ground bumps 3b, and the third groups C1 to C4 including only the coupling reinforcement bumps 3c.

More specifically, one group includes only the bumps 3 having the same function. Thus, the permissible number of lacked bumps 3 in each group can be set to a maximum value corresponding to the function of the bumps 3. As a result, the semiconductor component mounting apparatus 1 according to the embodiment can further reduce the number of semiconductor components 2 to be discarded.

Note that each group according to the above-described embodiment is formed to include a plurality of bumps 3 present in the same area on the semiconductor component 2. However, the group can be formed to include bumps positioned apart on one side and the other of the semiconductor component 2. The third group C3 shown in FIG. 8 includes six coupling reinforcement bumps 3c which are positioned at one end of the semiconductor component 2 in the widthwise direction and at one end in the longitudinal direction, and six coupling reinforcement bumps 3c which are positioned at the other end of the semiconductor component 2 in the widthwise direction and one end in the longitudinal direction.

The number of bumps 3 belonging to each group can be arbitrarily set to one or more.

If the number of electrodes lacked in each group is equal to or smaller than the permissible number of lacks, the determination unit according to the present invention determines that the semiconductor component is a non-defective. The semiconductor component mounting apparatus according to the present invention can mount even a semiconductor component lacked in electrodes without discarding it. Hence, the present invention can provide the semiconductor component mounting apparatus which increases the productivity.

What is claimed is:

1. A semiconductor component mounting apparatus comprising:
    an image sensing unit configured to sense a plurality of electrodes arranged on a mounting surface of a semiconductor component;
    an electrode detection unit configured to identify the electrodes in each of a plurality of groups arranged based upon functions of the electrodes, and to detect, for each of the electrodes, whether the electrode is lacking or not by using image data obtained by the image sensing unit; and
    a determination unit configured to determine quality of the semiconductor component, based on the number of the lacking electrodes detected by the electrode detection unit and a permissible number of lacking electrodes present to each of the groups, the determination unit determining that the semiconductor component is a defective semiconductor component if there is a group in which the electrodes more than the permissible number of lacking electrodes preset to the group are lacking, and if not, determining that the semiconductor component is a non-defective semiconductor component.

2. An apparatus according to claim 1, wherein said determination unit determines that the semiconductor component is a defective semiconductor component in case that the total number of lacking electrodes in all the groups is larger than a predetermined judgment number, and determines that the semiconductor component is a non-defective semiconductor component in the other cases.

3. An apparatus according to claim 1, wherein the groups include a first group including only the electrodes lack of which is inhibited, a second group including only the electrodes for grounding, and a third group including only the electrodes for coupling reinforcement.

* * * * *